(12) United States Patent
Schoessow et al.

(10) Patent No.: US 11,549,073 B2
(45) Date of Patent: Jan. 10, 2023

(54) INTEGRATED DESOLIDIFICATION FOR SOLID-CONTAINING RESIDUES

(71) Applicants: Cassandra Schoessow, Pearland, TX (US); Douglas Piotter, Katy, TX (US); Anand Subramanian, Sugar Land, TX (US)

(72) Inventors: Cassandra Schoessow, Pearland, TX (US); Douglas Piotter, Katy, TX (US); Anand Subramanian, Sugar Land, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 16/909,700

(22) Filed: Jun. 23, 2020

(65) Prior Publication Data
US 2020/0399547 A1 Dec. 24, 2020

Related U.S. Application Data

(60) Provisional application No. 62/865,335, filed on Jun. 24, 2019.

(51) Int. Cl.
*C10G 67/04* (2006.01)
*C10G 67/14* (2006.01)
(Continued)

(52) U.S. Cl.
CPC .............. *C10G 67/04* (2013.01); *B01D 3/10* (2013.01); *B01D 3/143* (2013.01);
(Continued)

(58) Field of Classification Search
CPC .. C10G 47/02–20; C10G 47/24; C10G 49/10; C10G 49/22; C10G 67/04; C10G 67/14
See application file for complete search history.

(56) References Cited

U.S. PATENT DOCUMENTS 2,840,922 A * 7/1958 Erisman ................ F28C 3/18
34/135
9,567,529 B2 * 2/2017 Cerea ................ F28D 21/0001
(Continued)

OTHER PUBLICATIONS

Millini, Roberto, et al., "Hydroconversion of Heavy Residues in Slurry Reactors: Developments and Perspectives," Journal of Catalysis, 308, Aug. 2013, pp. 189-200.
(Continued)

*Primary Examiner* — Renee Robinson
(74) *Attorney, Agent, or Firm* — Gary M. Machetta

(57) ABSTRACT

A desolidification process enables the isolation and extraction of solid additives from an unreacted petroleum residue stream. In a hydrocracking process that mixes a solid additive with a petroleum residue feedstock to convert the petroleum residue to higher-value distillates, the desolidification process enables the recovery of the unreacted petroleum residue for conversion to a saleable product. The desolidification process involves the mixture of one or more solvents with a slurry in which solids are integrated in the petroleum residue to generate a mixture having a decreased density and viscosity as compared to the slurry, which facilitates removal of the solids.

19 Claims, 5 Drawing Sheets

(51) Int. Cl.
  *B01D 3/14* (2006.01)
  *B01D 3/10* (2006.01)
  *B01D 11/04* (2006.01)
  *C10G 49/10* (2006.01)
  *C10G 49/22* (2006.01)

(52) U.S. Cl.
  CPC .......... *B01D 11/0492* (2013.01); *C10G 49/10* (2013.01); *C10G 49/22* (2013.01); *C10G 67/14* (2013.01); *C10G 2300/1077* (2013.01); *C10G 2300/301* (2013.01); *C10G 2300/302* (2013.01); *C10G 2300/308* (2013.01)

(56) References Cited

U.S. PATENT DOCUMENTS

| | | | |
|---|---|---|---|
| 2011/0174690 A1* | 7/2011 | Caneion | B01J 20/3078 208/112 |
| 2012/0132566 A1 | 5/2012 | Janssen et al. | |
| 2016/0130511 A1* | 5/2016 | Govindhakannan | C10G 53/02 208/96 |
| 2017/0145320 A1* | 5/2017 | Li | C10G 65/12 |
| 2018/0134965 A1* | 5/2018 | Brown | B01D 3/10 |
| 2018/0142166 A1 | 5/2018 | Al-Ghamdi | |

OTHER PUBLICATIONS

Motaghi, Mitra, et al., "In Favour of Hydrogen Addition," KBR Technology, Hydrocarbon Engineering, Oct. 2010, 5 pages.

Hydroconversion, Wiktionary, Mar. 7, 2017 (Mar. 7, 2017) [retrieved from the internet on Sep. 14, 2020 (Sep. 14, 2020) at <https://en/wiktionary.org/wiki/hydroconversion>] para 1.

* cited by examiner

INTEGRATED DESOLIDIFICATION FOR SOLID-CONTAINING RESIDUES

CROSS REFERENCE TO RELATED APPLICATION

This application claims priority to U.S. Provisional Patent Application having Ser. No. 62/865,335 filed on Jun. 24, 2019 which is incorporated by reference herein.

FIELD OF THE INVENTION

The present application relates to processes for desolidifying a slurry stream to isolate and recover the value of the liquid stream within which a solid is integrated. The described processes may find particular utility in, and are described in the context of, a hydrocracking and hydrotreating process that introduces a solid additive to a petroleum residue stream in the process of converting the petroleum residue to one or more higher-value distillate products. The processes could also be used to process slurries from thermal cracking processes, tar sands, or oily sludges generated by the refining business.

BACKGROUND

A significant aspect of crude oil refining involves the generation of higher-value products from petroleum residue (i.e., the portion of crude oil that does not distill through either atmospheric or vacuum distillation). Depending upon the type of crude oil and the specific refining process, petroleum residue accounts for between 25% and 85% by weight of the incoming crude oil feedstock. Petroleum residue is converted to more valuable distillate streams by cracking long hydrocarbon chains into simpler hydrocarbon molecules. The cracking reaction is typically induced by increased temperatures (thermal cracking) or by an acid catalyst (catalytic cracking). Hydrocracking is a particular type of cracking reaction that takes place in a hydrogen-rich environment.

Referring to FIG. 1 as an example process within which the desolidification process disclosed in this application might be utilized, process 100 employs a hydrocracking reaction to convert petroleum residues at high conversion rates into naptha, kerosene, diesel, and gas oil product streams. Process 100 additionally employs hydrotreating reactions to remove impurities that are present in the feedstock. The various reactions take place in a first stage liquid phase reactor section 106 and a second stage gas phase reactor section 134 and include hydrocracking, hydrodesulfurization (hydrogenating sulfur-containing compounds to produce hydrogen sulfide), hydrodenitrogenation (hydrogenating nitrogen-containing compounds to produce ammonia), olefin saturation, aromatic saturation, and isomerization (primarily rearrangement of normal paraffins to branched paraffins). The one or more reactors in the reactor sections 106 and 134 may be described as hydrocracker reactors. FIG. 1 is an elementary process flow diagram in which each depicted piece of process equipment represents a section of the process 100, which may in actuality include multiple pieces of process equipment.

In process 100, a feedstock stream 104 is split into a first feedstock stream 104A and a second feedstock stream 104B. As described above, the feedstock stream 104 may contain a petroleum residue such as a vacuum distillation residue. Alternatively, the feedstock stream 104 may contain bitumen, coal, a mixture of coal and petroleum residue, a mixture of plastic and residue, or mixtures of biomass and petroleum. The feedstock stream 104A is routed to a feed mix drum 110 where it is mixed with an additive stream 102. The additive stream 102 contains a solid additive such as activated carbon, and one of its main purposes is to absorb metals and coke precursors to prevent the formation of a coke layer in the first stage liquid phase reactor section 106 or on heat exchange surfaces in the preheat section 108. In particular, asphaltenes within the feedstock stream 104 are bound in the additive and are thereby hindered in their role as coke precursors. In the process 100 and in other processes within which the disclosed desolidification process may be employed, the additive may also include a catalyst (such as an iron catalyst, for example) used to promote reactions of coal and other more difficult feeds and/or sodium salts to control chlorides. The flow rates of the feedstock stream 104A and the additive stream 102 are controlled to maintain a consistent feedstock-to-additive ratio, which may be on the order of 9:1 to 20:1 by weight. The feed mix drum 110 is maintained at approximately atmospheric pressure and its contents are constantly mixed (e.g., via an agitator) to maintain a consistent slurry mixture within the drum 110.

The slurry mixture from the drum 110 is mixed with the feedstock stream 104B to form a feed slurry stream 114, which contains the additive (e.g., activated carbon additive, catalyst, salts, etc.) plus coal and/or other feed solids. The feed slurry stream 114 is pumped to the first stage reactor section 106 pressure of at least 3200 psig by the feed pump 115 and is combined with a makeup hydrogen stream 116, which is compressed to the first stage reactor section 106 pressure by a makeup compressor 120, to form a reactor feed stream 124. The makeup hydrogen stream 116 replaces hydrogen that is consumed in the process 100.

In the preheat section 108, the reactor feed stream 124 is heated to approximately 340° C. in a first heat exchange section 108I and is then further heated to the reactor section 106 inlet temperature of approximately 440° C. or greater by the fired heat exchanger 108B. The heated reactor feed stream 126 flows in an upward direction through one or more reactors in the reactor section 106. In the reactor section 106, the feedstock is cracked and hydrogenated at a temperature of approximately 440 to 480° C. Because the hydrogenation reaction is highly exothermic, the temperature in the reactor section 106 is maintained by injecting recycled hydrogen from recycle stream 118, which is compressed to the reactor section 106 pressure by the recycle compressor 122, as a quench gas at multiple locations (not shown in FIG. 1) along the reactor section 106. The flow rates of the hydrogen streams 116 and 118 are controlled to ensure that the slurry phase in the reactor section 106 is completely saturated with hydrogen and to provide a gas superficial velocity through the reactor section 106 that is high enough to sustain the fluidization of the slurry phase. The continuous presence of hydrogen in the reactor section 106 prohibits the formation of coke particles by coking reactions, which may occur in the case of hydrogen starvation.

The reactor effluent stream 128 exits the reactor section 106 and is passed through a separator section 130, which acts to knock out the liquids and solids in the effluent stream 128 to avoid entrainment of liquids and/or solids in the vapor product stream 132 that is routed to the second stage gas phase reactor section 134. In the reactor section 134, the feed stream 165 is passed in a downward flow through a series of fixed catalyst beds. Some of the catalyst beds induce additional hydrocracking reactions (e.g., further cracking of heavy compounds in the effluent stream 128 to maximize the production of diesel) while others induce hydrotreating reactions (e.g., aromatic saturation, desulfurization, and denitrogenation of compounds in the feed stream 165). The reactor section 134 operates near the pressure of the reactor section 106 as there is typically a pressure drop of less than 100 psi through the reactor section 106 and the separator section 130. The inlet temperature to each catalyst bed in the reactor section 134 is controlled between approximately 360° C. at the start of the catalyst lifecycle and approximately 390° C. at the end of the catalyst lifecycle to achieve desired conversion levels and to compensate for catalyst deactivation. Because the hydrocracking and hydrotreating reactions that take place in the reactor section 134 are highly exothermic and result in temperature increases across each catalyst bed, the inlet temperature to a catalyst bed is maintained by injecting recycled hydrogen from stream 167 as a quench gas upstream of the catalyst bed.

The product stream 136 that exits the reactor section 134 is passed to the separator section 138. In the separator section 138, the product stream 136 is cooled and wash water is injected to aid in the removal of ammonium salts to prevent corrosion. Vapor and aqueous phases are extracted from the separator section 138 and are passed to a treatment section 140 as indicated by stream 170. In the treatment section 140, the aqueous phase is passed to a sour water stripping unit and the vapor phase (which is primarily unreacted hydrogen) is passed through an amine absorber to remove hydrogen sulfide. The outputs of the treatment section 140 are a clean recycle hydrogen stream 152 and one or more waste streams 154. The liquid hydrocarbon stream 141 exiting the separator section 138 is passed to the fractionator section 142, where its constituent components are separated into a naptha stream 144, a kerosene stream 146, a diesel stream 148, and a gas oil stream 150. For vacuum residue feedstock, the process 100 converts greater than 95% by weight of the feedstock stream 104 to the higher value naptha (144), kerosene (146), diesel (148), and gas oil (150) streams. The hydrotreated gas oil stream 150 may be passed to a fluidized catalytic cracker unit for further processing.

The slurry stream 156 exiting the separator section 130 contains unconverted feedstock material, spent additive solids, vacuum gas oil, and a small amount of lighter distillates. The slurry stream 156 is routed to the vacuum section 158 that operates at approximately 25 mmHg absolute, which represents a pressure drop of greater than 3000 psi from the separator section 130 inlet. In the vacuum section 158, the vacuum gas oil and distillates are separated from the unconverted feedstock material and the spent additive solids. The vacuum gas oil and distillate stream 160 that exits the vacuum section 158 as vapor is condensed and pumped to the second stage gas phase reactor section 134 inlet pressure by the pump 162 as feed stream 164, which is combined with the product stream 132 to form the feed stream 165 to the reactor section 134. The unconverted feedstock material and spent additive solids stream 166 that exits the bottom of the vacuum section 158 is passed to a waste processing section 168. In the waste processing section, the stream 166 is solidified (e.g., by passing the stream 166 through a furnace) and disposed of as waste. For process 100, this waste stream 166 is the subject of the application.

DETAILED DESCRIPTION OF THE INVENTION

The inventors have determined that one drawback of the process 100 (and of similar processes that utilize solid additives such as catalysts, etc. to convert petroleum residues) is the loss of the value of the unconverted feedstock. While the process 100 is successful in converting a large portion (e.g., >95%) of the feedstock to higher value distillate streams, there is some value in the unconverted feedstock. For example, unconverted petroleum residue such as vacuum distillation residue can be processed and sold as asphalt. However, in the process 100 and similar processes that employ solid additives, the spent additive is integrated in the viscous unconverted feedstock (in the stream 166), which prevents the further processing of the unconverted feedstock to generate a saleable product. As a result, the unconverted feedstock material and the spent additive are solidified and processed as a waste stream. Thus, the process 100 and similar processes result in not only the loss in value of the unconverted feedstock material but also the added cost of processing the unconverted material as a waste stream. Moreover, any value associated with the spent additive (either in the recovery of the additive itself or materials such as metals in the feedstock that are bound to the additive) is also lost when the stream 166 is handled as waste.

Figure 1:
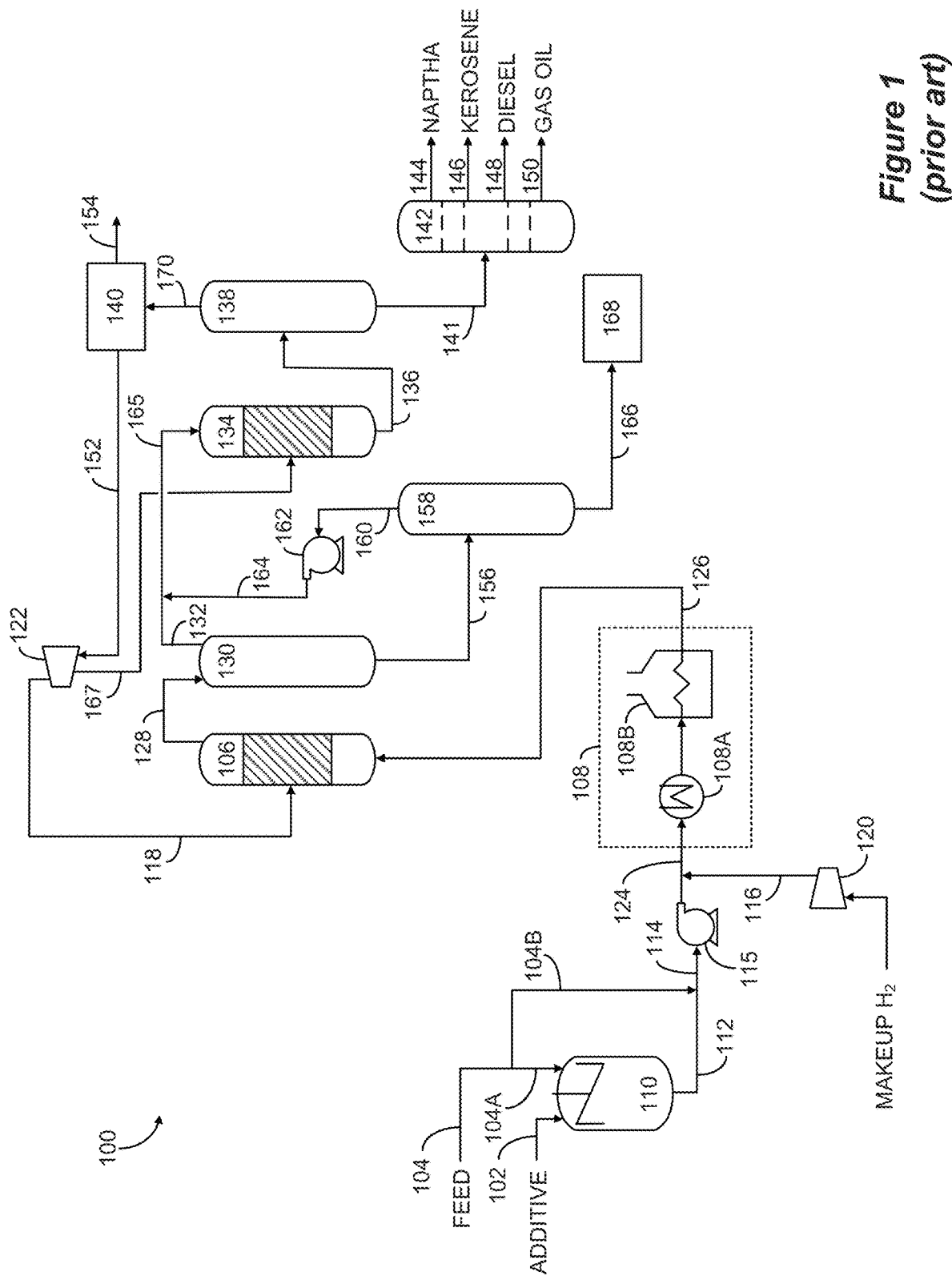
FIG. 1 is an elementary process flow diagram of a hydrocracking and hydrotreating process in accordance with the prior art.
Figure 2:
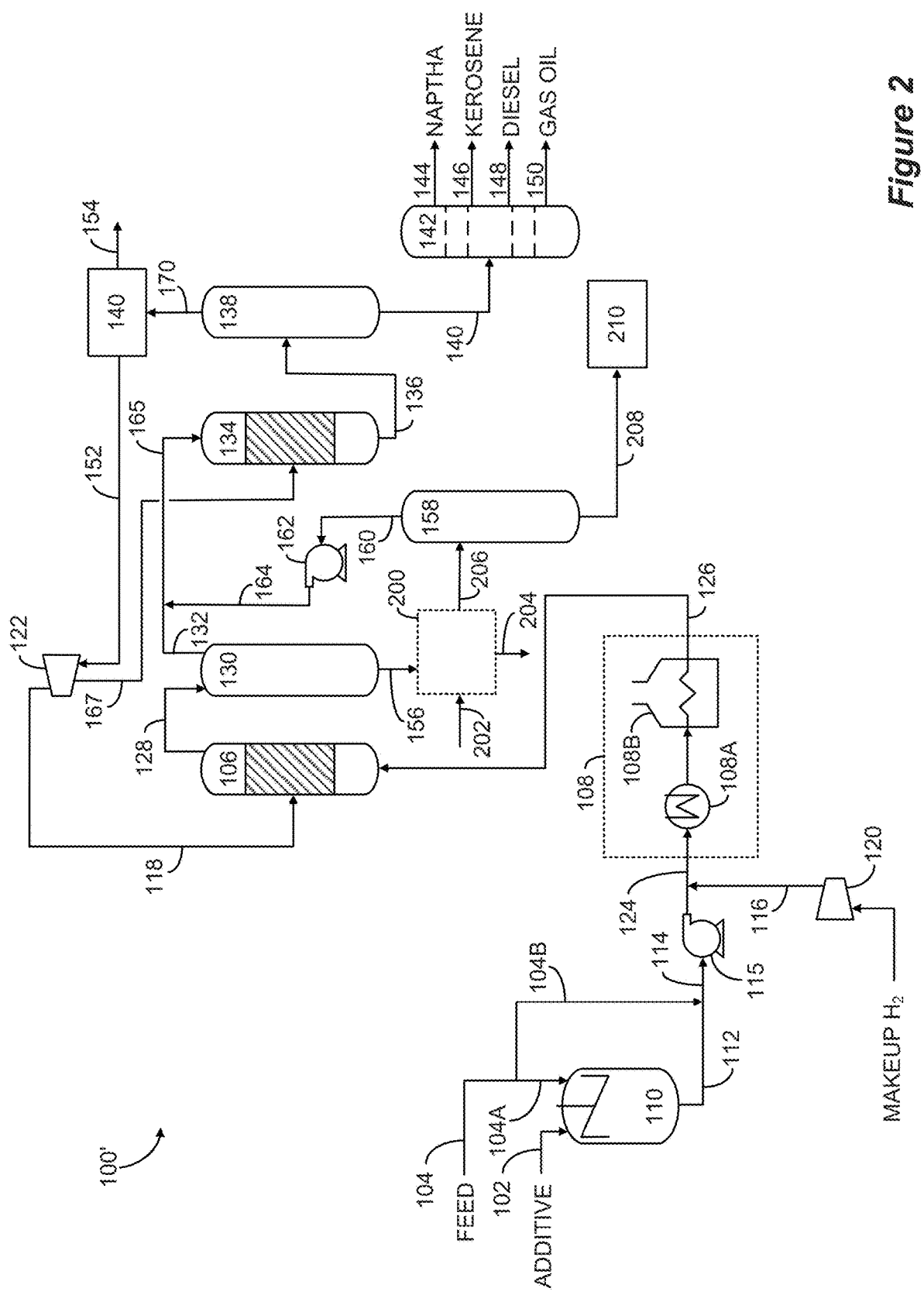
FIG. 2 is an elementary process flow diagram of the hydrocracking and hydrotreating process of FIG. 1 with an incorporated desolidification process in accordance with an embodiment of the disclosure.

To combat these problems, the inventors have conceived of a desolidification process that can be implemented within process 100 and other similar processes that involve the introduction of a solid additive into a feed stream. Referring to FIG. 2, process 100' incorporates desolidification section 200, which is positioned between the separator section 130 and the vacuum section 158 to remove the solids from the slurry stream 156. The process 100' differs from the process 100 only in the addition of the desolidification section 200 and corresponding equipment and streams are labeled with the same designators even where the stream or equipment may differ in some respects as a result of the addition of the desolidification section 200.

The desolidification section 200 receives the slurry stream 156 from the separator section 130. The slurry stream 156 is mixed with a solvent stream 202, which enables the solids in the slurry stream 156 to be extracted as a solids stream 204 to generate a solids-free solvent and unconverted feedstock vacuum feed stream 206. As a result of the addition of the desolidification section 200, the vacuum section 158 bottoms stream 208 is free of solids. Consequently, the unconverted feedstock material in stream 208 is further processed in processing section 210, such as an asphalt blending section, to generate a saleable product, and the waste processing section 168 is eliminated. Although the illustrated positioning of the desolidification section 200 upstream of the vacuum section 158 allows the vacuum section 158 to be designed to operate free of solids, in another embodiment, the desolidification section 200 could be positioned to receive the stream 166 that exits the bottom of the vacuum section 158 in the process 100.

Figure 3:
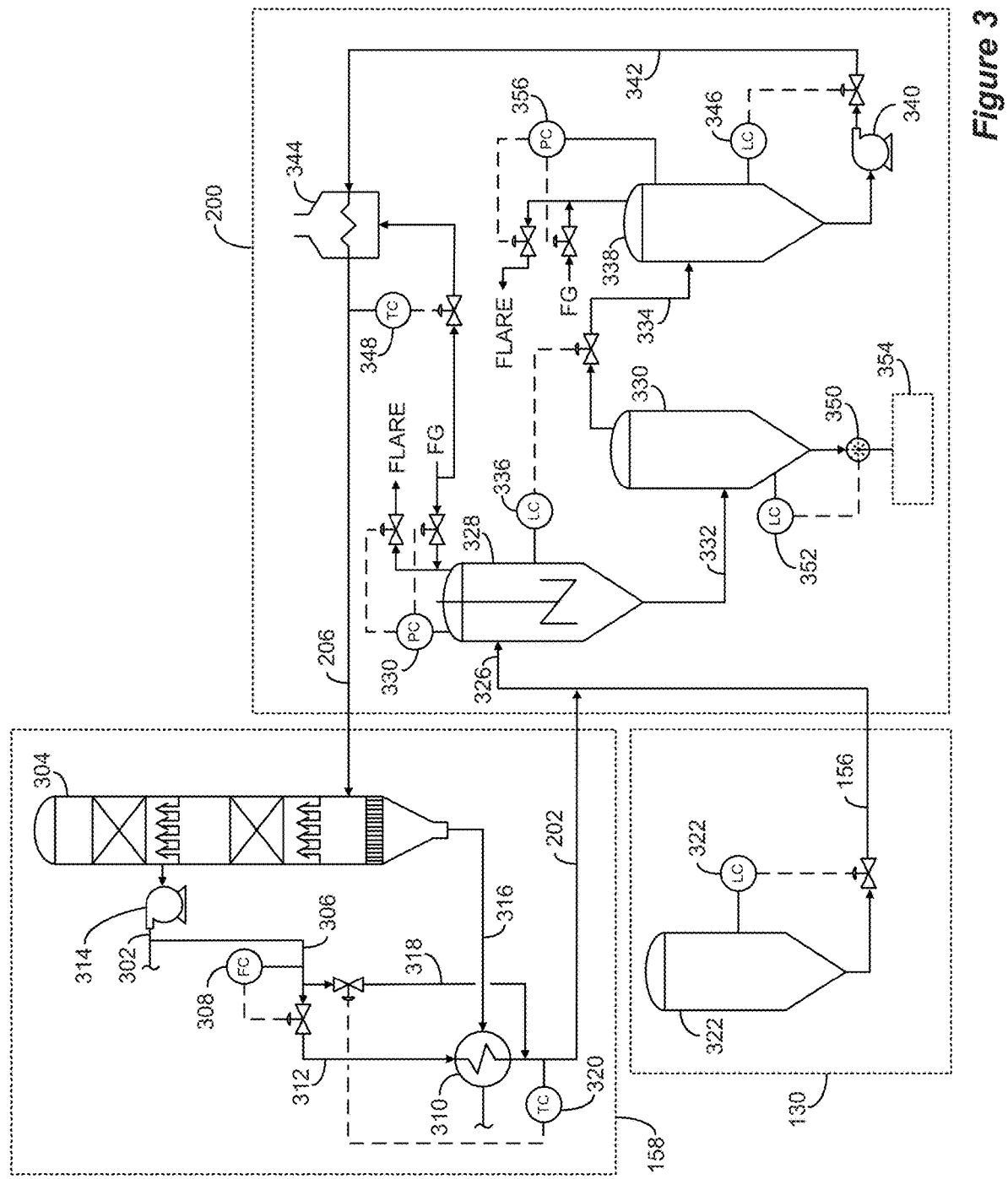
FIG. 3 is a process flow diagram of a desolidification process in accordance with an embodiment of the disclosure.

FIG. 3 is a process flow diagram for one particular implementation of the desolidification section 200 in the process 100'. The depicted process flow diagram shows a single process train in the desolidification section 200. In some implementations, the desolidification section 200 may comprise one or more additional redundant parallel trains. In the illustrated embodiment, condensed vacuum gas oil is drawn from a chimney tray just below the top section of a vacuum tower 304 in the vacuum section 158 and is pumped to approximately 150 psig by vacuum gas oil pump 314 as vacuum gas oil stream 302. A portion of the vacuum gas oil stream 302 is extracted for use as the solvent stream 202 that is provided to the desolidification section 200. While the described embodiment employs vacuum gas oil as the solvent, other materials (such as diesel, kerosene, light vacuum gas oil, FCC light cycle oil, FCC heavy cycle oil, naptha, toluene, etc.) can also be employed as the solvent. The flow rate of the extracted stream 306 is regulated by a flow controller 308 to provide a consistent flow of vacuum gas oil solvent to be mixed with the slurry stream 156. A first portion 312 of the extracted stream 306, which has a temperature of approximately 190° C., can be routed through a heat exchanger 310 in which it is heated against the vacuum tower bottoms stream 316, which is primarily unconverted feedstock material having a temperature of approximately 310° C. A second portion 318 of the extracted stream 306 is routed around the heat exchanger 310 and ties back into the first portion 312 at the exit of the heat exchanger 310. The proportion of the extracted stream 306 that is routed around the heat exchanger 310 as the second portion 318 is regulated by the temperature controller 320 to keep the mixture of stream 156 and 202 below the bubble point. When lower boiling point solvents are used, the temperature of stream 326 must be reduced to maintain the mixture below the bubble point.

A slurry mixture that contains spent additive solids and unconverted feedstock material is drawn off of the low pressure separator 322 in the separator section 130 as slurry stream 156. The rate at which material is drawn off of the bottom of the low pressure separator 322 is regulated by the level controller 324 to maintain a constant level in the separator 322. The slurry stream 156 is mixed with the solvent stream 202 to form the desolidification feed stream 326. The streams 202 and 156 are mixed at a mixing tee or a mixing nozzle such as an orifice mixer to facilitate the integration of the streams. The warm solvent in the solvent stream 202 decreases the viscosity and density of the slurry stream 156, which enables the spent additive solids to be more easily separated from the unconverted feedstock material in the desolidification section 200. The warm solvent also helps dissolve heavy aromatics on the inside and outside of additive particles. The combination of the hot slurry stream 156 (which is still at an elevated temperature of approximately 400 to 425° C. due to its progression through the preheat section 108 and the reactor section 106) and the solvent stream 202 (approximately 200° C.) results in a feed stream 326 temperature of between 250 and 300° C. This temperature range is appropriate for vacuum gas oil solvent, however, in other embodiments that employ lower density or vicosity solvents such as diesel, kerosene, light vacuum gas oil, or light cycle oil, the temperature of the feed stream 326 must be controlled to a level at which solvent flashing is avoided. Other solvents may be used to improve the solubility of the heavy oil in the solvent. The optimum temperature for any solvent will always be the temperature just below the bubble point of the mixture. A well-controlled operation should be able to maintain the temperature within 10 degrees of the optimum. The ratio of the solvent stream 202 flow rate to the slurry stream 156 flow rate will vary based upon the composition of the streams, but, in the illustrated embodiment, the flow rate of the solvent stream 202 is set by the flow controller 308 to achieve a target solvent-to-slurry mass flow ratio of approximately 7:4. In another embodiment, the flow rate of the slurry stream 156 is measured and the flow controller 308 setpoint is set by a ratio controller to maintain a fixed solvent-to-slurry mass flow ratio. The solvent-to-slurry mass flow ratio could change significantly depending on the solvent chosen. Increasing the ratio (i.e., increasing the solvent flow rate) reduces settling time in the vessel 330, which can offset any improvement in separation that might be attained by the increased amount of solvent. Solvent-to-slurry mass flow ratios from 1.5:1 to 5:1 are envisioned.

The desolidification feed stream 326 is routed to the mix drum 328, which, in the illustrated embodiment, has a conical bottom and is mixed by an agitator (at minimum) to maintain a consistent mixture in which the spent additive solids are held in suspension. Recirculating pumps may also be required depending on the size of the drum to assist with the mixing. Such pumps would return a portion of stream 334 from drum 330 back to the mix drum. Internal baffles and other similar mixing improvement items can also be added to the mix drum 328 to improve mixing. In another embodiment, the mix drum 328 may be configured as a rotating disc column in which the solvent stream flows upward counter to the slurry stream 156 thru numerous stacked mixing chambers in series. The mix drum 328 is padded with fuel gas under control of the pressure controller 330 to maintain a mix drum pressure of approximately 30 psig.

The mixture in the mix drum 328 flows either by gravity or a slight pressure differential to the solid separation drum 330 as suspension stream 332. The solid separation drum 330 also has a conical bottom and is held in a liquid full state. In the solid separation drum 330, the spent additive solids fall out of the suspension to the bottom of the drum 330, which results in a substantially solid-free mixture of unconverted feedstock and solvent in the top section of the solid separation drum 330. The solvent and unconverted feedstock liquid mixture is drawn off of the top section of the drum 330 as liquid stream 334. The rate at which liquids are drawn off of the drum 330 is regulated by the level controller 336 to maintain a constant level in the mix drum 328. In a preferred embodiment, the size of the mix drum 328 and the level controller 336 setpoint are determined to achieve a residence time in the mix drum of at least 10 minutes to allow time for the heavy oil inside the pores of the additive to be diluted and removed. Increased residence times will enable the removal of more materials from the additive. The inventors have observed that increased residence times of greater than 30 minutes result in increased capital costs but do not improve recovery significantly. The solid separation drum 330 is sized to achieve a residence time that enables the solids to fall out of the suspension to the bottom of the drum 330. Larger particles settle in just a few minutes, and the smallest particles will likely not settle in any practical amount of time. There is therefore a tradeoff in capital cost (i.e., the size of the drum 330) and the degree of solid settling. The inventors have determined that a residence time of 120 minutes (based on the total inlet volume flow) enables a recovery of a great degree of the solids that can be recovered practically, but again, the size of the separation drum 330 can be adjusted to attain the desired level of separation.

The liquid stream 334 is routed to the vacuum column feed drum 338, which also has a conical bottom. The vacuum column feed drum 338 is padded with fuel gas under control of the pressure controller 356 to maintain a pressure of approximately 15 psig. The unconverted feedstock and solvent mixture is pumped off by the feed pump 340 as stream 342 to the feed heater 344 at a rate regulated by the level controller 346 to maintain the level in the drum 338. The stream 342, which has a temperature of approximately 230 to 275° C., is heated to a temperature high enough to vaporize the solvent, approximately 370° C. in this scenario. The firing rate of the heater 344 is regulated by the temperature controller 348 to maintain the temperature of the stream 206. The heated feed stream 206 is routed to the flash zone of the vacuum column 304. In the vacuum column 304, the lighter solvent goes overhead as a vapor stream and continues through the process 100' while the unconverted feedstock material, which is free of solids, exits the bottom of the vacuum column 304 and is further processed to generate a saleable product.

The spent additive solids are removed from the solid separation drum 330 through the rotary valve 350 and routed to the solids-handling section 354. The removal rate of the solids is regulated by level controller 352 to maintain the solid-liquid interface level in the drum 330.

Figure 4:
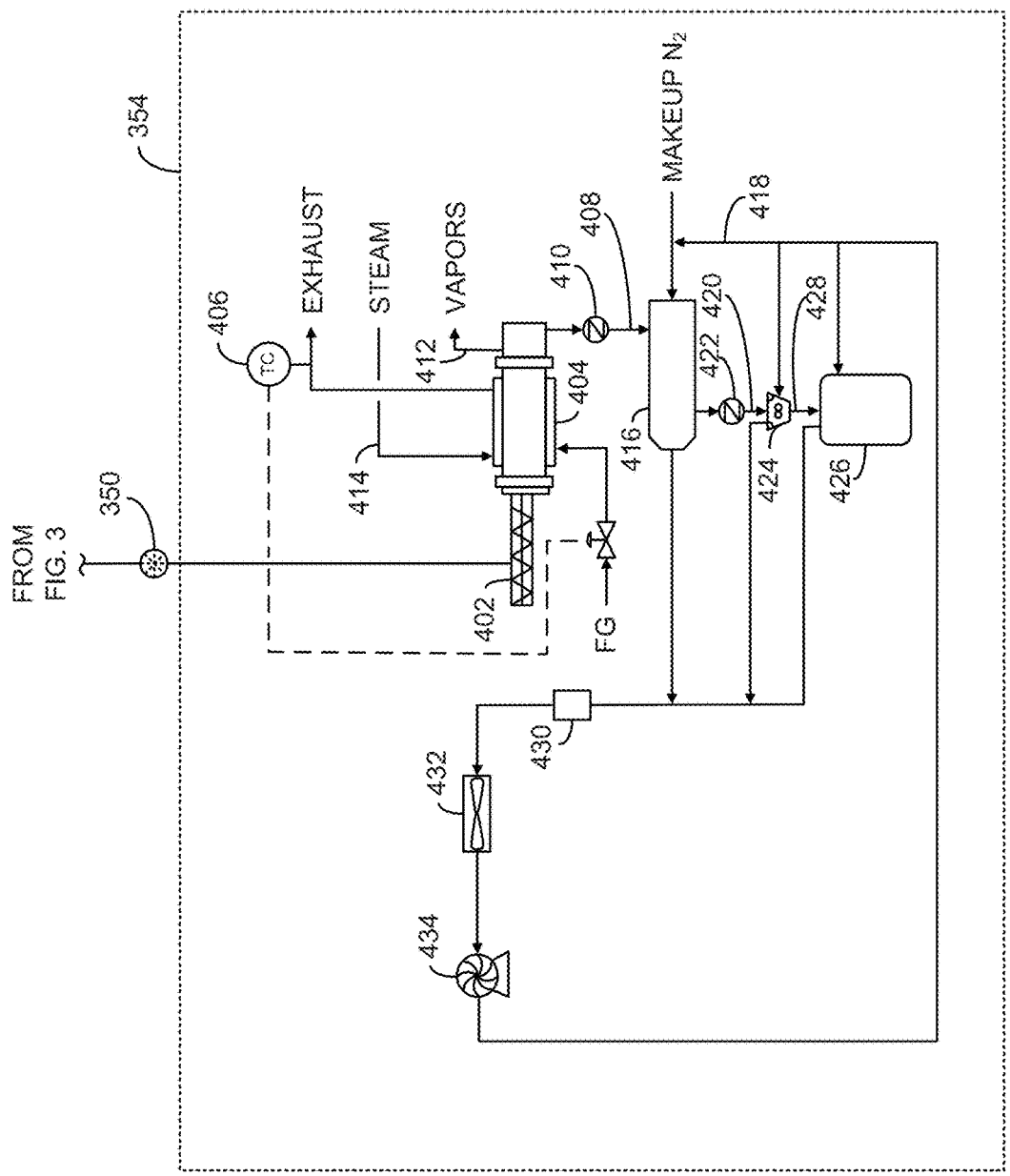
FIG. 4 is a process flow diagram of a solids handling section of the desolidification process of FIG. 3 in accordance with an embodiment of the disclosure.

FIG. 4 illustrates the solids-handling section 354 of the desolidification section 200. The oil-wetted solids that are removed from the solid separation drum 330 through the rotary valve 350 are conveyed along the screw conveyor 402 into the solid rotary drier 404. In the drier 404, the solids are dried by a combination of indirect heating to approximately 450° C. and the introduction of stripping steam 414. The stripping steam 414 may be saturated steam having a pressure between 50 and 100 psig, for example. The firing rate in the drier 404 is regulated by the temperature controller 406 to maintain the temperature in the drier 404. The dried solid particles exit the drier 404 as dried solid stream 408 through the three flap solids valve 410. The hydrocarbon vapors that are evaporated from the oil-wetted solids exit the drier 404 as vapor stream 412, and they are either recycled into the process 100' or handled as waste.

The hot, dried solids, which are at an elevated temperature of approximately 450° C., are routed to a rotary cooler 416. In the rotary cooler 416, the solids are exposed to a cooling nitrogen circulating stream 418. The cooling solidifies any remaining hydrocarbons into a solid that can be handled without sticking. The cooled solids exit the rotary cooler 416 as cooled solid stream 420 through the three flap valve 422 and are routed to a roller crusher 424. In the roller crusher 424, the solids are again exposed to the cooling nitrogen stream 418 and are crushed into more uniformly-sized particles. The crushed particles are routed from the roller crusher 424 to the solid storage drum 426 as crushed solid stream 428. In the storage drum 426, the solid particles are once again exposed to the cooling nitrogen stream 418 to achieve a final temperature of approximately 80° C.

The cooling nitrogen stream that exits the equipment (i.e., the rotating cooler 416, the roller crusher 424, and the storage drum 426) is routed through a nitrogen cyclone 430 to remove any solid particles from the cooling stream. The nitrogen is then cooled in an air cooler 432 before being recirculated to the equipment by the nitrogen blower 434. A nitrogen makeup stream replaces any nitrogen lost in the cooling process.

Although the described embodiment of the solids handling section 354 employs nitrogen as a cooling medium, other types of cooling could also be used. For example, the dried solid particles in the stream 408 could alternatively be routed through a water bath to accomplish the necessary cooling.

The solid particles in the storage drum 426 can be processed in different manners. In one embodiment, the solid particles may be disposed of as waste. In another embodiment, the solid particles may be further processed to extract any value in the additive itself. For example, if a metal additive is utilized in the process 100', the solids may be further processed to remove any impurities from the metal to recover the value of the metal additive. In yet another embodiment, the solid particles may be further processed to extract the value of compounds absorbed by the additive. For example, the additive may absorb valuable components such as metals from the feedstock stream and these valuable components may be extracted from the solids in the solid storage drum 426 through further processing.

While the described desolidification process 200 utilizes vacuum gas oil as the solvent stream 202, other solvents can also be employed. For example, diesel, kerosene, light vacuum gas oil, light cycle oil or other solvents that decrease the density and viscosity and improve solubility of the heavy oil in the slurry stream 156 can be used. As noted above, when different solvents are employed, the temperature of the combined solvent and hot slurry stream should be controlled to avoid solvent flashing.

Figure 5:
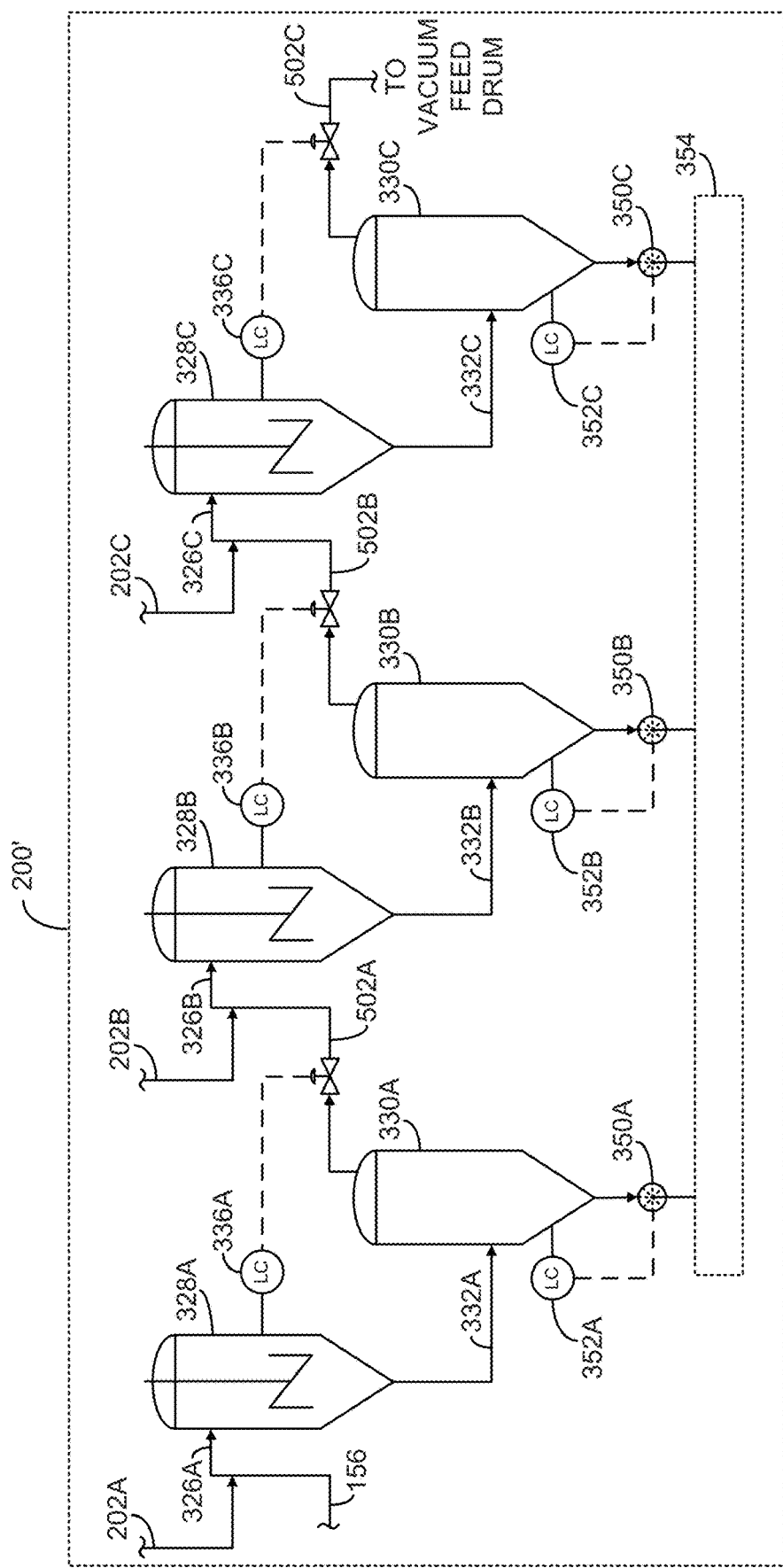
FIG. 5 is a process flow diagram of a portion of a desolidification process that incorporates a multiple stage solid separation process in accordance with an embodiment of the disclosure.

In another embodiment, the desolidification process may employ a multiple stage solid separation process. A portion of a desolidification process 200' that employs a multiple stage solid separation process is illustrated in FIG. 5. As with the process 200 illustrated in FIG. 3, the process 200' may include one or more additional redundant parallel trains. The desolidification process 200' is the same as the process 200 with the exception that the mix drum 328 and solid separation drum 330 are replaced with a series of mix drums 328A/B/C and solid separation drums 330A/B/C. As in the process 200, the solid-containing slurry mixture 156 is mixed with a first solvent stream 202A to form a feed stream 326A. As described above, the solvent 202A may be any solvent that decreases the viscosity of the slurry mixture 156 such that the solids can be separated out of the slurry.

The combined feed stream 326A is mixed in a first stage mix drum 328A and the mixed suspension stream 332A exiting the first stage mix drum 328A is routed to the first stage solid separation drum 330A, which is held in a liquid full state. Each of the mix drums 328A/B/C is padded with fuel gas (not shown in FIG. 5 for purposes of clarity) in the same manner as is the mix drum 328 in process 200 to maintain a desired vessel pressure. The pressure setpoint is decreased from the first stage mix drum 328A to a second stage mix drum 328B to a third stage mix drum 328C to provide the driving force for moving the liquid streams through the process 200'. Liquid comprising the first solvent and the unconverted feedstock material is drawn from the top of the first stage solid separation drum 330A as liquid stream 502A at a rate that is regulated by the level controller 336A to maintain a constant level in the mix drum 328A. However, rather than routing the liquid stream 502A to the vacuum feed drum 338, the liquid stream 502A is mixed with a second solvent 202B, which may be the same as or a different solvent than the solvent 202A, to form an intermediate stream 326B. The stream 326B is mixed in a second stage mix drum 328B and the process flow continues in the same manner through a second stage solid separation drum 330B to facilitate additional solid settling. Liquid is similarly drawn from the top of the second stage solid separation drum 330B as liquid stream 502B at a rate that is regulated by the level controller 336B to maintain a constant level in the second stage mix drum 328B. The liquid stream 502B is mixed with a third solvent stream 202C, which may again be the same as or a different solvent from the solvents 202A and 202B, to form intermediate stream 326C. The process flow continues in the same manner through a third stage mix drum 328C and a third stage solid separation drum 330C until the liquid effluent in the stream 502C is passed to the vacuum column feed drum 338. Although process 200' illustrates a three-stage solid separation process, more or fewer stages could be utilized. Solids are drawn from the bottoms of the solid separation drums 330A/B/C through rotary valves 350A/B/C at a rate that is regulated by the level controllers 252A/B/C to maintain the solid-liquid interface levels in the drums 330. The extracted solids are routed to the solid handling section 354 in a similar manner as in the process 200.

The use of multiple stages enables the same or a higher degree of solid separation with smaller mix drums 328 and separation drums 330 than in the single stage arrangement. In one embodiment, a lower boiling point solvent is employed at each stage. For example, in one embodiment, vacuum gas oil is used as a first solvent 202A, light cycle oil is used as a second solvent 202B, and diesel is used as a third solvent 202C.

The disclosed desolidification process enables the isolation and extraction of solid additives from an unreacted petroleum residue stream in which the solids are integrated. Although described in the context of the process 100, the desolidification process may be used in other similar processes (e.g., other slurry phase processes) that utilize solid additives (such as solid catalysts) in the conversion of petroleum residues. In a hydrocracking process that incorporates a solid additive into a petroleum residue feedstock, the desolidification process enables the recovery of the unreacted petroleum residue for conversion to a saleable product.

As used herein, naptha and gasoline include petroleum distillates having a boiling point range of approximately 30° to 200° C.; kerosene includes petroleum distillates having a boiling point range of approximately 150° to 275° C.; diesel, distillate, and FCC light cycle oil include petroleum distillates having a boiling point range of approximately 150° to 375° C.; vacuum gas oil includes petroleum distillates having a boiling point range of approximately 350° to 625° C.; and asphalt or residue include petroleum products having a boiling point range of approximately 475° C. and higher, all according to the ASTM D86 standard.

It will be understood that the disclosed embodiments are illustrative and not limiting. For example, the described process equipment, process conditions, instrumentation, and control schemes are provided as an illustration of one or more implementations of the disclosed desolidification process. Numerous modifications and variations could be made to the disclosed embodiments by those skilled in the art without departing from the scope of the invention set forth in the claims.

What is claimed is:

1. A method, comprising:
mixing a solid additive with a petroleum residue;
cracking the petroleum residue in a reactor containing hydrogen;
receiving a first portion of an effluent from the reactor, wherein the first portion comprises unreacted petroleum residue and the solid additive;
mixing the first portion with a solvent in a mix drum to form a mixture that has a lower density and viscosity than the first portion;
routing the mixture from the mix drum to a solid separation drum;
allowing the mixture to separate into a liquid portion containing the solvent and the unreacted petroleum residue and a solid portion containing the solid additive; and
removing the solid portion from the bottom of the separation drum at a rate to maintain a solid-liquid interface level in the separation drum.

2. The method of claim 1, wherein the solid additive is an activated carbon material.

3. The method of claim 1, wherein the solid additive is a metal.

4. The method of claim 1, wherein the solid additive is a catalyst.

5. The method of claim 1, wherein the solvent comprises one of vacuum gas oil, FCC light cycle oil, FCC heavy cycle oil, naphtha, diesel, and toluene.

6. The method of claim 1, wherein the petroleum residue comprises vacuum distillation residue from a crude oil refining process.

7. The method of claim 1, wherein the mix drum is a mix drum with an agitator.

8. The method of claim 1, further comprising:
drying the solid additive material in a drier; and
cooling the dried solid additive material.

9. The method of claim 8, wherein cooling the dried solid additive material comprises exposing the dried solid additive material to a cooling gas flow in a rotating cooler.

10. The method of claim 9, wherein the cooling gas is nitrogen.

11. The method of claim 8, wherein cooling the dried solid additive material comprises exposing the dried solid additive material to a cooling water bath.

12. The method of claim 1, further comprising routing the liquid portion from the separation drum to a separation column and using the separation column to separate the liquid portion into a first stream that is enriched in unreacted petroleum residue and a second stream that is enriched in solvent.

13. A method, comprising:
receiving a first portion of a first hydrocracker reactor effluent, wherein the first portion is a slurry stream comprising unreacted petroleum residue and a solid additive material;
mixing the first portion with a first solvent to form a first mixture that has a lower density and viscosity than the first portion;
allowing the first mixture to separate into a first solid portion and a first liquid portion in a first solid separation vessel;
mixing the first liquid portion with a second solvent to form a second mixture; and
allowing the second mixture to separate into a second solid portion and a second liquid portion in a second solid separation vessel.

14. The method of claim 13, wherein the solid additive material is a mixture of an activated carbon material, a metal, and a salt.

15. The method of claim 13, wherein the first solvent is vacuum gas oil.

16. The method of claim 13, wherein the second solvent has a lower atmospheric pressure boiling point than the first solvent.

17. The method of claim 13, wherein the first liquid portion comprises the unreacted petroleum residue and the first solvent and further comprising routing the first liquid portion to a separation column that operates at less than atmospheric pressure to separate the first solvent from the unreacted petroleum residue.

18. The method of claim 13, wherein mixing the first portion with the first solvent comprises mixing the first portion with the first solvent in a mix drum with an agitator.

19. The method of claim 13, further comprising extracting the first solid portion from the first solid separation vessel at a rate to maintain a solid-liquid interface level in the first solid separation vessel.

* * * * *